(12) United States Patent
Saito et al.

(10) Patent No.: US 9,587,039 B2
(45) Date of Patent: Mar. 7, 2017

(54) FLUORINATED-CONTAINING MACROINITIATOR AND PRODUCTION PROCESS FOR THE SAME

(71) Applicant: Unimatec Co., Ltd., Tokyo (JP)

(72) Inventors: Satoru Saito, Kitaibaraki (JP); Katsuyuki Sato, Kitaibaraki (JP); Takehiro Sonoi, Kitaibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 15/107,644

(22) PCT Filed: Dec. 22, 2014

(86) PCT No.: PCT/JP2014/083923
§ 371 (c)(1),
(2) Date: Jun. 23, 2016

(87) PCT Pub. No.: WO2015/098847
PCT Pub. Date: Jul. 2, 2015

(65) Prior Publication Data
US 2016/0340448 A1    Nov. 24, 2016

(30) Foreign Application Priority Data
Dec. 25, 2013   (JP) .................................. 2013-267282

(51) Int. Cl.
| C08L 53/00 | (2006.01) |
| C08L 33/06 | (2006.01) |
| C08F 6/12 | (2006.01) |
| C08F 6/14 | (2006.01) |
| C08F 2/38 | (2006.01) |
| C08F 4/04 | (2006.01) |

(52) U.S. Cl.
CPC .................. *C08F 2/38* (2013.01); *C08F 4/04* (2013.01); *C08F 2438/03* (2013.01)

(58) Field of Classification Search
CPC ........... C08F 2/38; C08F 4/04; C08F 2438/03
See application file for complete search history.

(56) References Cited

U.S. PATENT DOCUMENTS

| 9,169,383 B2* | 10/2015 | Farnham .................... C08F 6/12 |
| 2010/0120970 A1 | 5/2010 | Biggs et al. |
| 2013/0165579 A1 | 6/2013 | Mruk et al. |
| 2013/0231400 A1 | 9/2013 | Kim |
| 2015/0004379 A1* | 1/2015 | Farnham ............. C08F 293/005 |
| | | 428/195.1 |

FOREIGN PATENT DOCUMENTS

| JP | 2004300313 A | 10/2004 |
| JP | 200663132 A | 3/2006 |
| JP | 2008297522 A | 12/2008 |
| JP | 2009242550 A | 10/2009 |
| JP | 2010512444 A | 4/2010 |
| JP | 2010235784 A | 10/2010 |
| JP | 2012236891 A | 12/2012 |
| JP | 2013139563 A | 7/2013 |
| JP | 2013227505 A | 11/2013 |
| WO | 2011099540 A1 | 8/2011 |
| WO | 2013027679 A1 | 2/2013 |
| WO | 2013120051 A1 | 8/2013 |
| WO | 2013120055 A1 | 8/2013 |

OTHER PUBLICATIONS

Benoit et al., "Development of a Universal Alkoxyamine for "Living" Free Radical Polymerizations", J. Am. Chem. Soc., 1999, pp. 3904-3920, vol. 121.
Koiry et al., "Reversible addition-fragmentation chain transfer (RAFT) polymerization of 2,2,3,3,4,4,4-heptafluorobutyl acrylate (HFBA)", J. Fluorine Chem., 2013, pp. 137-142, vol. 153.
Matyjaszewski et al., "Atom Transfer Radical Polymerization", Chem. Rev., Sep. 2001, pp. 2921-2990, vol. 101, No. 9.
Moad et al., "Living Radical Polymerization by the Raft Process", Aust. J. Chem., 2005, pp. 379-410, vol. 58.

* cited by examiner

Primary Examiner — Robert Harlan
(74) Attorney, Agent, or Firm — The Webb Law Firm

(57) ABSTRACT

Provided is a fluorine-containing macroinitiator, particularly a fluorine-containing macroinitiator that enables production of a fluorine-containing block copolymer containing a non-fluorine vinyl-based monomer having a long side chain. The fluorine-containing macroinitiator includes a polymer represented by the following formula (1) and having a number-average molecular weight of 3,000 to 100,000. In the following formula (1), $R^2$, $R^3$ and $R^4$ are each a specific group, and Q is a polymer segment composed of a structural unit represented by the following formula (2). In the following formula (2), $R^1$ is a hydrogen atom or a methyl group, Rf is a fluoroalkyl group having a specific structure, and k is an appropriate integer that is not 0.

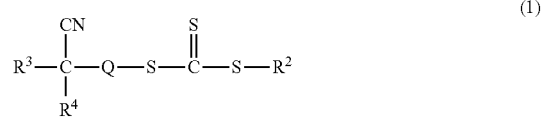

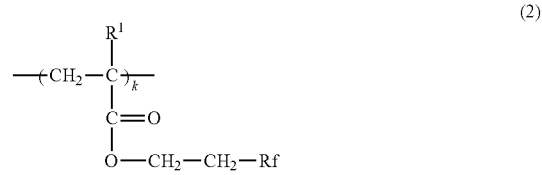

7 Claims, 2 Drawing Sheets

FLUORINATED-CONTAINING MACROINITIATOR AND PRODUCTION PROCESS FOR THE SAME

CROSS-REFERENCE TO RELATED APPLICATIONS

This application is the United States national phase of International Application No. PCT/JP2014/083923 filed Dec. 22, 2014, and claims priority to Japanese Patent Application No. 2013-267282 filed Dec. 25, 2013, the disclosures of which are hereby incorporated in their entirety by reference.

TECHNICAL FIELD

The present invention relates to a fluorine-containing macroinitiator and a production process for the same. More particularly, the present invention relates to a fluorine-containing macroinitiator having a trithiocarbonic ester group at one end of a polymer and having a cyanoalkyl group at the other end of the polymer, and a production process for the same.

BACKGROUND ART

With the progress of living radical polymerization technology, precise control of molecular weight, molecular end, molecular weight distribution and molecular chain molecular arrangement of a polymer has become possible in recent years. Particularly in controlled living radical polymerization, such as reversible addition fragmentation chain transfer polymerization (RAFT polymerization), atom transfer radical polymerization (ATRP) or nitroxide-mediated radical polymerization (NMP), low-temperature polymerization and strict purification of monomers in anionic polymerization or the like are unnecessary, and there is a merit of a wide application range of monomers. Moreover, there is an advantage that the polymerization can be readily carried out under usual radical polymerization conditions (industrial versatility), and it has become possible to readily prepare copolymers or homopolymers having various structures and functions.

Among them, Non-patent Document 1 describes that various studies of RAFT polymerization, including examination of reaction mechanism, examination of reactivity due to substituents, etc., have been made. Non-patent Document 2 describes that various studies of ATRP have been also made. Non-patent Document 3 describes an attempt to control polymerization of a variety of vinyl-based monomers by means of nitroxide-mediated living free radical polymerization.

By the use of these techniques, fluorine-containing block copolymers can be prepared (Patent Documents 1 to 6).

For example, Patent Document 1 discloses a water and oil repellent block copolymer that is a block copolymer constituted of a fluorine segment and a non-fluorine segment and has a specific contact angle. It describes that such a water and oil repellent block copolymer is obtained by, in the presence of a specific transition metal catalyst, first polymerizing a non-fluorine-based monomer and then polymerizing a fluorine-based monomer.

Patent Document 2 discloses an organic solvent-based coating improver containing a block copolymer that contains, as a polymer unit, a specific fluoroaliphatic group-containing monomer having a repeating structure composed of a methyl group and a repeating structure composed of a difluoromethyl group, and an optical film obtained by using this improver. Patent Document 2 describes that such a block copolymer is obtained by, for example, obtaining a macroinitiator from an acrylic ester or the like through an ATRP process and polymerizing a (meth)acrylate monomer having a fluoroaliphatic group with this macroinitiator by an ATRP process.

Patent Document 3 describes that a block copolymer is obtained by, in the presence of a specific compound having a —C(=S)S— group, polymerizing a first monomer having at least one polymerizable group and then polymerizing a second monomer having at least one polymerizable group and a perfluoroalkyl group.

Patent Document 4 discloses a surface treatment agent containing a fluorine-containing acrylic block copolymer that comprises a specific fluorine-containing acrylic-based segment containing a repeating unit derived from a fluorine-containing monomer and a specific non-fluorine acrylic-based segment containing a repeating unit derived from a non-fluorine monomer. Patent Document 4 describes that the fluorine-containing acrylic block copolymer was obtained by, in the presence of a copper catalyst, first polymerizing a non-fluorine monomer to form a non-fluorine acrylic-based segment and subsequently polymerizing a fluorine-containing monomer with the non-fluorine acrylic-based segment to form a fluorine-containing acrylic-based segment.

Patent Document 5 discloses a block copolymer obtained by copolymerizing, as essential monomer components, a first radical polymerizable unsaturated monomer having a fluorinated alkyl group of a specific number of carbon atoms and a second radical polymerizable unsaturated monomer having a reactive group through living radical polymerization based on ATRP or the like is disclosed. Patent Document 5 describes that the block copolymer is obtained by first subjecting the second radical polymerizable unsaturated monomer to living radical polymerization, then adding the first radical polymerizable unsaturated monomer and further subjecting it to living radical polymerization.

In the Patent Document 6 discloses, as a process for producing a block copolymer by polymerizing a first monomer in the presence of an alkoxyamine catalyst to give a polymer of the first monomer and then polymerizing a second monomer in the presence of an alkoxyamine catalyst and the polymer of the first monomer, a process adopting a fluorine-containing (meth)acrylate monomer as at least one of these monomers.

However, in the case where a (A)n(B)m block copolymer constituted of a fluorine-containing vinyl-based monomer (A) and a non-fluorine vinyl-based monomer (B) is prepared by controlled living radical polymerization, it is necessary that the non-fluorine vinyl-based monomer (B) should be polymerized first to give a polymer (B)m and thereafter the fluorine-containing vinyl-based monomer (A) should be polymerized.

Particularly in the RAFT polymerization, it is often difficult to obtain a homopolymer (A)n of a fluorine-containing vinyl-based monomer, and therefore, a technique is typically adopted which comprises polymerizing a non-fluorine vinyl-based monomer (B) in the first polymerization step and polymerizing a fluorine-containing vinyl-based monomer (A) in the second polymerization step to produce (B)m(A)n.

For example, some examples of RAFT polymerization of a fluorine-containing vinyl-based monomer alone have been reported (see Non-Patent Document 4 and its cited reference). However, the fluorine-containing vinyl-based monomer is limited to a (meth)acrylic ester having a short side-chain fluoroalkyl chain, and such a technique lacks generality as a polymerization technique. Further, a polymerization experiment of 3,3,4,4,5,5,6,6,7,7,8,8,8-tridecafluorooctyl acrylate at 60° C. for 16 hours using 2-cyano-2-propyl dithiobenzoate that is a compound analogous to 4-cyanopentanoic acid dithiobenzoate used in the Non-Patent Document 4 (this experiment was carried out by the present inventors) resulted in an unsatisfactory degree of polymerization of 19%.

When a fluorine-containing block copolymer containing, as a non-fluorine vinyl-based monomer, stearyl acrylate or stearyl methacrylate having a long side chain, or styrene is produced, polymerization of the non-fluorine vinyl-based monomer in the first polymerization step proceeds, but in the second polymerization step for polymerizing a fluorine-containing vinyl-based monomer, living property is lost, and a homopolymer (A)n of the fluorine-containing vinyl-based monomer (A) is produced in a large amount.

Moreover, also in the case where the side chain of the non-fluorine vinyl-based monomer (B) is short, if the weight of the fluorine-containing vinyl-based monomer (A) fed in the second polymerization step is relatively large as compared with the weight of (B)m produced in the first polymerization step (e.g., (B)m:(A)=20 wt %:80 wt %) as in the case of production of a fluorine-containing block copolymer having a high content of the fluorine-containing vinyl-based monomer (A), a homopolymer (A)n of the fluorine-containing vinyl-based monomer (A) is often produced in the second polymerization step.

CITATION LIST

Patent Literature

Patent Document 1: Japanese Patent Laid-Open Publication No. 2004-300313
Patent Document 2: Japanese Patent Laid-Open Publication No. 2006-63132
Patent Document 3: Japanese Patent Laid-Open Publication No. 2008-297522
Patent Document 4: Japanese Patent Laid-Open Publication No. 2009-242550
Patent Document 5: Japanese Patent Laid-Open Publication No. 2010-235784
Patent Document 6: WO2011/099540

Non Patent Literature

Non-Patent Document 1: Moad, G. et al., *Aust. J. Chem.*, 2005, 58, 379-410
Non-Patent Document 2: Matyjaszewski, K. et al., *Chem. Rev.*, 2001, 101, 2921-2990
Non-Patent Document 3: Benoit, D. et al., *J. Am. Chem. Soc.*, 1999, 121, 3904
Non-Patent Document 4: Koiry, B. P. et al., *J. Fluorine Chem.*, 2013, 153, 137-142

It is an object of the present invention to provide a fluorine-containing macroinitiator, particularly a fluorine-containing macroinitiator that enables production of a fluorine-containing block copolymer containing, as a non-fluorine vinyl-based monomer, a (meth)acrylic ester having a long side chain or styrene.

SUMMARY OF THE INVENTION

In the light of the above circumstances in the conventional technologies, the present inventors have earnestly studied in order to produce a fluorine-containing macroinitiator capable of solving the above problem, and as a result, they have found that the above problem can be solved by using, as a macroinitiator, a fluorine-containing polymer having a specific structure and that such a fluorine-containing macroinitiator can be readily produced under special reaction conditions.

By the present invention, there is provided a fluorine-containing macroinitiator comprising:
a polymer represented by the following formula (1) and having a number-average molecular weight of 3,000 to 100,000,

[Chem. 1]

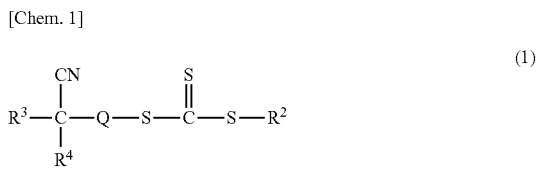

wherein $R^2$ is a straight-chain alkyl group of 1 to 18 carbon atoms, $R^3$ and $R^4$ are each independently a hydrogen atom or an alkyl group of 1 to 3 carbon atoms, and any one of $R^3$ and $R^4$ may contain one carboxyl group, and Q is a polymer segment composed of a structural unit represented by the following formula (2):

[Chem. 2]

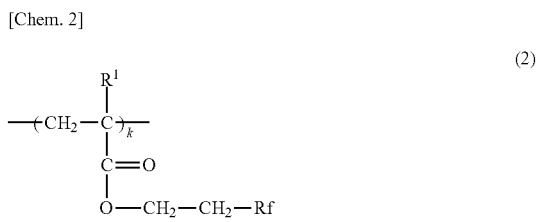

wherein $R^1$ is a hydrogen atom or a methyl group,

Rf is a fluoroalkyl group represented by the following formula (3) or a fluoroalkyl group represented by the following formula (4), and k is an appropriate integer that is not 0,

[Chem. 3]

wherein n is an integer of 1 to 6,

[Chem. 4]

wherein a is an integer of 0 to 3, b is an integer of 1 to 2, n' is an integer of 1 to 6, —$C_nF_{2n'+1}$ group is bonded to $CH_2$ group of —$(CF_2CH_2)_b$— group, and —$(CF_2CF_2)_a$— group is bonded to $CF_2$ group of —$(CF_2CH_2)_b$— group.

The present inventors have earnestly studied a production process for such a fluorine-containing macroinitiator (1), and as a result, they have found that such a macroinitiator can be readily produced under special reaction conditions. This ready production process is also provided.

Such a production process is, for example, a production process for the fluorine-containing macroinitiator, comprising:

a step of polymerizing a fluorine-containing (meth)acrylic ester represented by the following formula (6) using an azo-based radical polymerization initiator in the presence of a trithiocarbonic ester compound represented by the following formula (5):

[Chem. 5]

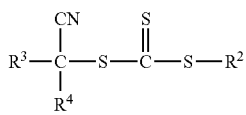
(5)

wherein $R^2$ is a straight-chain alkyl group of 1 to 18 carbon atoms, and $R^3$ and $R^4$ are each independently a hydrogen atom or an alkyl group of 1 to 3 carbon atoms, and any one of $R^3$ and $R^4$ may contain one carboxyl group,

[Chem. 6]

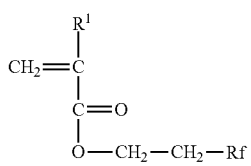
(6)

wherein $R^1$ is a hydrogen atom or a methyl group, and

Rf is a fluoroalkyl group represented by the following formula (3) or a fluoroalkyl group represented by the following formula (4),

[Chem. 7]

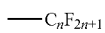
(3)

wherein n is an integer of 1 to 6,

[Chem. 8]

(4)

wherein a is an integer of 0 to 3, b is an integer of 1 to 2, n' is an integer of 1 to 6, —$C_nF_{2n'+1}$ group is bonded to $CH_2$ group of —$(CF_2CH_2)_b$— group, and —$(CF_2CF_2)_a$— group is bonded to $CF_2$ group of —$(CF_2CH_2)_b$— group.

Advantageous Effects of Invention

By the use of the fluorine-containing macroinitiator of the present invention, it becomes possible to produce a fluorine-containing block copolymer containing, as a non-fluorine vinyl-based monomer, stearyl (meth)acrylate having a long side chain or styrene. Further, it becomes possible to produce also a fluorine-containing block copolymer having a high content of a fluorine-containing vinyl-based monomer.

DETAILED DESCRIPTION OF THE INVENTION

Figure 1:
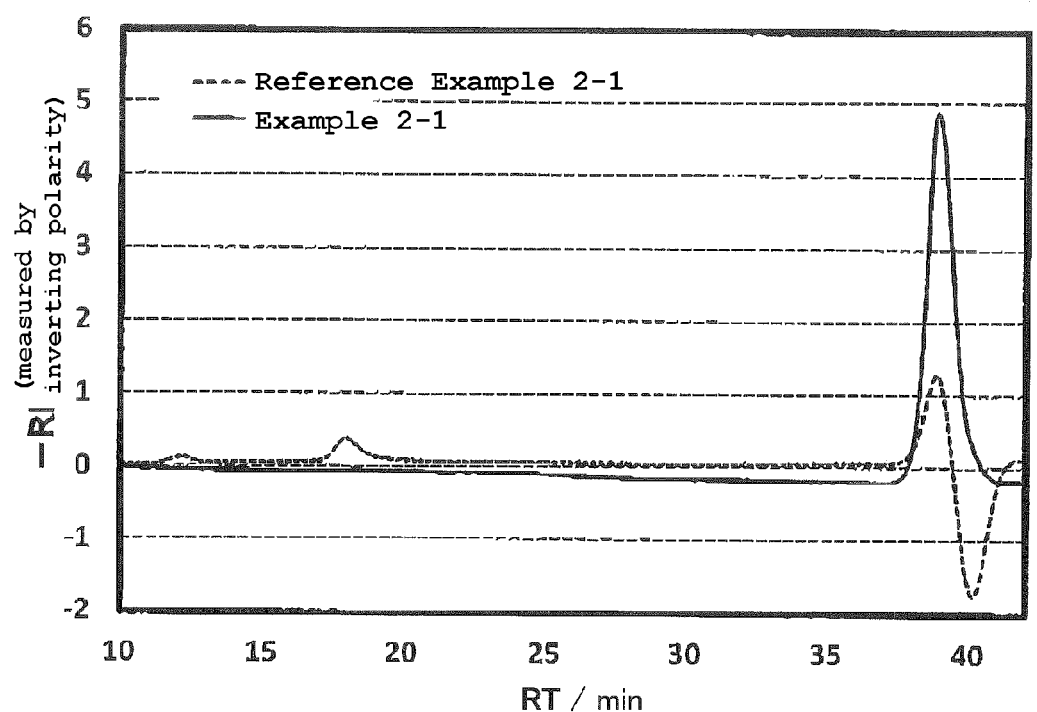
FIG. 1 shows GPC charts of polymers obtained in Example 2-1 and Reference Example 2-1. Here, the polymer of Example 2-1 is a polymer obtained by polymerizing a fluorine-containing vinyl-based monomer in a first stage polymerization step to produce a fluorine-containing macroinitiator and then polymerizing stearyl acrylate in a second stage polymerization step, and the polymer of Reference Example 2-1 is a polymer obtained by polymerizing stearyl acrylate in a first stage polymerization step and then polymerizing a fluorine-containing vinyl-based monomer in a second stage polymerization step.

Embodiments of the present invention are described hereinafter.

[Fluorine-Containing Macroinitiator]

The fluorine-containing macroinitiator of the present invention comprises a polymer represented by the following formula (1) and having a number-average molecular weight of 3,000 to 100,000.

[Chem. 9]

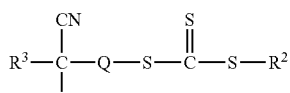
(1)

In the formula (1), $R^2$ is a straight-chain alkyl group of 1 to 18 carbon atoms, $R^3$ and $R^4$ are each independently a hydrogen atom or an alkyl group of 1 to 3 carbon atoms, and any one of $R^3$ and $R^4$ may contain one carboxyl group, and Q is a polymer segment composed of a structural unit represented by the following formula (2).

[Chem. 10]

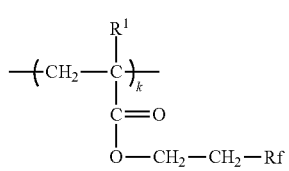
(2)

In the formula (2), $R^1$ is a hydrogen atom or a methyl group,

Rf is a fluoroalkyl group represented by the following formula (3) or a fluoroalkyl group represented by the following formula (4), and k is an appropriate integer that is not 0.

[Chem. 11]

$$—C_nF_{2n+1} \quad (3)$$

In the formula (3), n is an integer of 1 to 6.

[Chem. 12]

$$—\!\left(\!CF_2\!-\!CF_2\!\right)_{\!a}\!\left(\!CF_2\!-\!CH_2\!\right)_{\!b}\!—\!C_{n'}F_{2n'+1} \quad (4)$$

In the formula (4), a is an integer of 0 to 3, b is an integer of 1 to 2, n' is an integer of 1 to 6, $—C_nF_{2n'+1}$ group is bonded to $CH_2$ group of $—(CF_2CH_2)_b—$ group, and $—(CF_2CF_2)_a—$ group is bonded to $CF_2$ group of $—(CF_2CH_2)_b—$ group.

When the Rf is a fluoroalkyl group represented by the formula (4), a is preferably 1 or 2 from the viewpoints of bioaccumulation potential and environmental burden.

On the other hand, when the Rf is a fluoroalkyl group represented by the formula (3), n is preferably 4 or 6 from the viewpoints of bioaccumulation potential and environmental burden.

Specific examples of such Rf include 1,1,2,2,3,3,4,4,4-nonafluorobutyl group, 1,1,2,2,3,3,4,4,5,5,6,6,6-tridecafluorohexyl group, 1,1,3,3,4,4,5,5,6,6,6-undecafluorohexyl group, 1,1,2,2,3,3,5,5,6,6,6-undecafluorohexyl group, 1,1,3,3,4,4,5,5,6,6,7,7,8,8,8-pentadecafluorooctyl group, 1,1,2,2,3,3,5,5,6,6,7,7,8,8,8-pentadecafluorooctyl group, 1,1,2,2,3,3,4,4,5,5,7,7,8,8,8-pentadecafluorooctyl group, 1,1,2,2,3,3,5,5,6,6,7,7,8,8,9,9,10,10,10-nonadecafluorodecyl group, 1,1,2,2,3,3,4,4,5,5,7,7,8,8,9,9,10,10,10-nonadecafluorodecyl group, 1,1,2,2,3,3,4,4,5,5,6,6,7,7,9,9,10,10,10-nonadecafluorodecyl group, 1,1,2,2,3,3,4,4,5,5,7,7,8,8,9,9,10,10,11,11,12,12,12-trieicosafluorododecyl group, 1,1,3,3,5,5,6,6,7,7,8,8,8-tridecafluorooctyl group, 1,1,2,2,3,3,5,5,7,7,8,8,8-tridecafluorooctyl group, 1,1,3,3,5,5,6,6,7,7,8,8,9,9,10,10,10-heptadecafluorodecyl group, 1,1,2,2,3,3,5,5,7,7,8,8,9,9,10,10,10-heptadecafluorodecyl group, 1,1,2,2,3,3,4,4,5,5,7,7,9,9,10,10,10-heptadecafluorodecyl group, 1,1,2,2,3,3,5,5,7,7,8,8,9,9,10,10,11,11,12,12,12-heneicosafluorododecyl group, 1,1,2,2,3,3,4,4,5,5,7,7,9,9,10,10,11,11,12,12,12-heneicosafluorododecyl group, and 1,1,2,2,3,3,4,4,5,5,7,7,9,9,10,10,11,11,12,12,13,13,14,14,14-pentaeicosafluorotetradecyl group.

In the present invention, the above $R^2$ is a straight-chain alkyl group of 1 to 18 carbon atoms. However, when hydrolysis resistance of the later-described trithiocarbonic ester compound (5) used in the later-described production process of the present invention is taken into consideration, $R^2$ is preferably a straight-chain alkyl group of 6 to 18 carbon atoms.

The above $R^3$ and $R^4$ are each independently a hydrogen atom or an alkyl group of 1 to 3 carbon atoms, and any one of $R^3$ and $R^4$ may contain one carboxyl group. Examples of such $R^3$ and $R^4$ include hydrogen atom, methyl group, ethyl group, n-propyl group, isopropyl group and 2-carboxyethyl group.

As previously described, the polymer segment Q that constitutes the fluorine-containing macroinitiator of the present invention is composed of a structural unit represented by the above formula (2). In the present invention, the structural units represented by the formula (2) and constituting the polymer segment Q may be those of one kind alone or may be those of a combination of two or more kinds.

Specific examples of such polymers to constitute the fluorine-containing macroinitiator of the present invention include the following polymers (in the following formulas, k' is an appropriate integer that is not 0).

[Chem. 13-1]

(1-1)

$$H-\underset{\underset{H}{|}}{\overset{\overset{CN}{|}}{C}}-(CH_2-\underset{\underset{C=O}{|}}{\overset{\overset{H}{|}}{C}})_{k'}-S-\overset{\overset{S}{\|}}{C}-S-C_{12}H_{25}$$
$$\underset{O-CH_2-CH_2-CF_2CF_2CF_2CF_2CH_2CF_2CF_2CF_2CF_3}{}$$

(1-2)

$$H-\underset{\underset{H}{|}}{\overset{\overset{CN}{|}}{C}}-(CH_2-\underset{\underset{C=O}{|}}{\overset{\overset{H}{|}}{C}})_{k'}-S-\overset{\overset{S}{\|}}{C}-S-C_{12}H_{25}$$
$$\underset{O-CH_2-CH_2-CF_2CF_2CF_2CF_2CF_3}{}$$

(1-3)

$$H-\underset{\underset{H}{|}}{\overset{\overset{CN}{|}}{C}}-(CH_2-\underset{\underset{C=O}{|}}{\overset{\overset{H}{|}}{C}})_{k'}-S-\overset{\overset{S}{\|}}{C}-S-C_{12}H_{25}$$
$$\underset{O-CH_2-CH_2-CF_2CF_2CF_2CF_3}{}$$

[Chem. 13-2]

(1-11)

$$H_3C-\underset{\underset{CH_3}{|}}{\overset{\overset{CN}{|}}{C}}-(CH_2-\underset{\underset{C=O}{|}}{\overset{\overset{H}{|}}{C}})_{k'}-S-\overset{\overset{S}{\|}}{C}-S-C_{12}H_{25}$$
$$\underset{O-CH_2-CH_2-CF_2CF_2CF_2CF_2CH_2CF_2CF_2CF_2CF_3}{}$$

(1-12)

$$H_3C-\underset{\underset{CH_3}{|}}{\overset{\overset{CN}{|}}{C}}-(CH_2-\underset{\underset{C=O}{|}}{\overset{\overset{H}{|}}{C}})_{k'}-S-\overset{\overset{S}{\|}}{C}-S-C_{12}H_{25}$$
$$\underset{O-CH_2-CH_2-CF_2CF_2CF_2CF_2CF_3}{}$$

(1-13)

$$H_3C-\underset{\underset{CH_3}{|}}{\overset{\overset{CN}{|}}{C}}-(CH_2-\underset{\underset{C=O}{|}}{\overset{\overset{H}{|}}{C}})_{k'}-S-\overset{\overset{S}{\|}}{C}-S-C_{12}H_{25}$$
$$\underset{O-CH_2-CH_2-CF_2CF_2CF_2CF_3}{}$$

[Chem. 13-3]
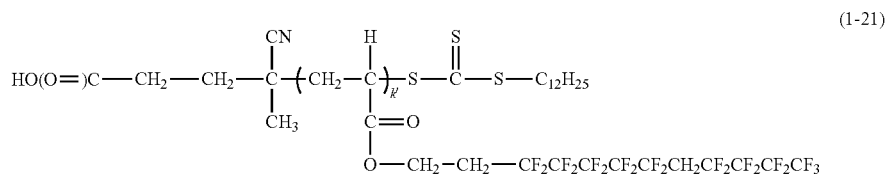
(1-21)
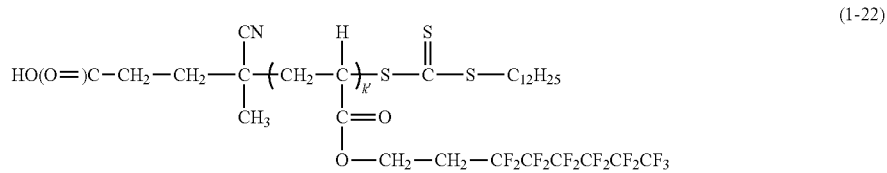
(1-22)
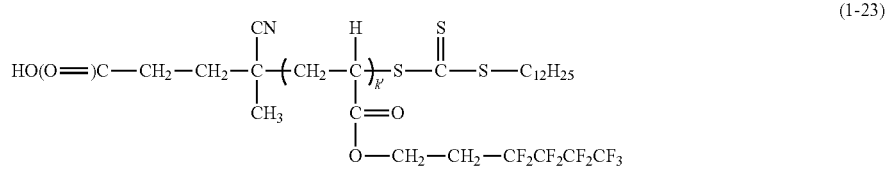
(1-23)
[Chem. 13-4]
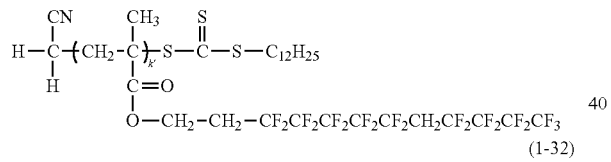
(1-31)
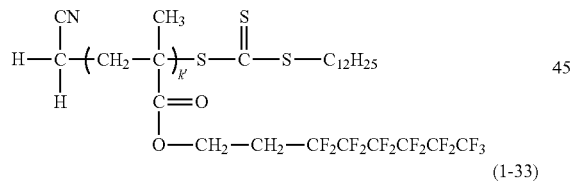
(1-32)
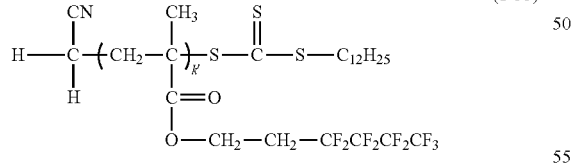
(1-33)
[Chem. 13-5]
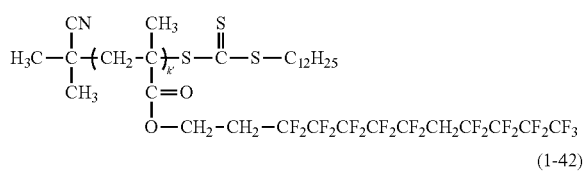
(1-41)
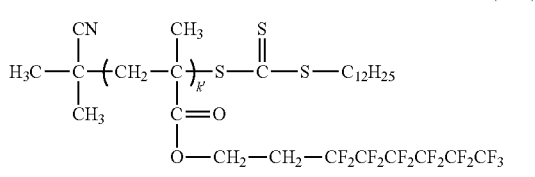
(1-42)
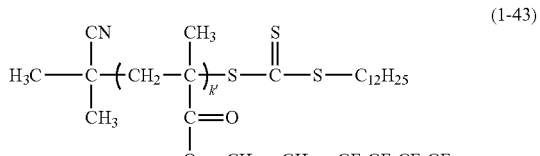
(1-43)
[Chem. 13-6]
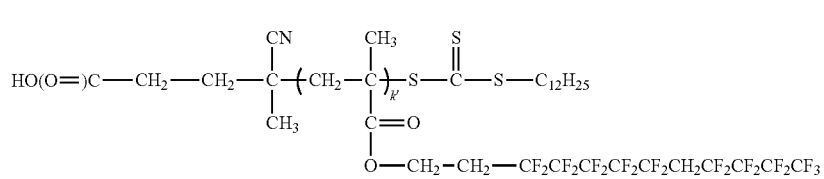
(1-51)

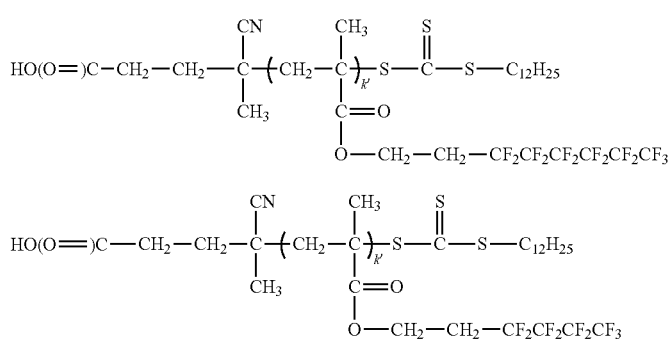

(1-52)

(1-53)

A method for calculating this number-average molecular weight is not specifically restricted, but for example, the number-average molecular weight can be determined on the basis of a ratio of an integrated value of H peaks derived from the polymer segment Q to an integrated value of H peaks derived from portions other than the polymer segment Q in the fluorine-containing macroinitiator of the present invention. Here, a fluorine-containing macroinitiator obtained by the later-described production process of the present invention using the later-described trithiocarbonic ester compound (5) and one kind of the later-described fluorine-containing (meth)acrylic ester (6) is taken as an example for the calculation of the number-average molecular weight. When the molecular weight of a portion corresponding to the trithiocarbonic ester compound (5) is denoted by $M_0$, the molecular weight of the fluorine-containing (meth)acrylic ester (6) is denoted by $M_1$, the integrated value of appropriate H peaks characteristic of a portion corresponding to the trithiocarbonic ester compound (5) and the number of H corresponding to those peaks are denoted by $I_0$ and $N_0$, respectively, and the integrated value of appropriate H peaks characteristic of the fluorine-containing (meth)acrylic ester (6) and the number of H corresponding to those peaks are denoted by $I_1$ and $N_1$, respectively, the number-average molecular weight can be determined as M' obtained by the following formula (Eq-1'):

$$M'=M_0+[M_1\times(I_1/N_1)/(I_0/N_0)] \qquad \text{(Eq-1')}$$

In the present invention, however, M determined by the following formula (Eq-1) on the basis of the below-described Examples may be regarded as a number-average molecular weight of the fluorine-containing macroinitiator for convenience.

$$M=M_1\times(I_1/N_1)/(I_0/N_0) \qquad \text{(Eq-1)}$$

In this case, the value of the above $(I_1/N_1)/(I_0/N_0)$ corresponds to the above k regarding the structural unit derived from the fluorine-containing (meth)acrylic ester (6).

Here, when the polymer segment Q is composed of two or more kinds of structural units represented by the formula (2) in the polymer that constitutes the fluorine-containing macroinitiator of the present invention, a relationship which the above k should satisfy is strictly examined below.

On the assumption that the polymer segment Q is composed of x kinds of structural units represented by the formula (2), if k and a molecular weight of the "i"th structural unit of the structural units represented by the formula (2) (or the corresponding fluorine-containing (meth) acrylic ester (6)) are denoted by $k_i$ and $M_i$, respectively, and a molecular weight of a portion other than the polymer segment Q (or the corresponding trithiocarbonic ester compound (5)) in the polymer that constitutes the fluorine-containing macroinitiator of the present invention is denoted by $M_0$, a value of $$M_0 + \sum_{i=1}^{x}(M_i \times k_i) \qquad \text{[Math. 1]}$$

becomes a number-average molecular weight defined regarding the polymer that constitutes the fluorine-containing macroinitiator of the present invention in a case based on views of the above formula (Eq-1'), and a value of $$\sum_{i=1}^{x}(M_i \times k_i) \qquad \text{[Math. 2]}$$

becomes a number-average molecular weight defined regarding the same polymer in a case based on views of the above formula (Eq-1).

[Production Process for Fluorine-Containing Macroinitiator]

A production process for the aforesaid fluorine-containing macroinitiator of the present invention is not specifically restricted.

In a typical embodiment of the present invention, however, the aforesaid fluorine-containing macroinitiator of the present invention can be preferably obtained by a production process comprising a step of polymerizing a fluorine-containing (meth)acrylic ester represented by the following formula (6) using an azo-based radical polymerization initiator in the presence of a trithiocarbonic ester compound represented by the following formula (5).

[Chem. 14]

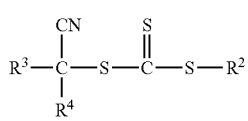

(5)

In the formula (5), $R^2$ is a straight-chain alkyl group of 1 to 18 carbon atoms, and $R^3$ and $R^4$ are each independently a hydrogen atom or an alkyl group of 1 to 3 carbon atoms, and any one of $R^3$ and $R^4$ may contain one carboxyl group.

[Chem. 15]

$$CH_2=\overset{R^1}{\underset{\underset{O-CH_2-CH_2-Rf}{\overset{\|}{C=O}}}{C}} \quad (6)$$

In the formula (6), $R^1$ is a hydrogen atom or a methyl group, and
Rf is a fluoroalkyl group represented by the following formula (3) or a fluoroalkyl group represented by the following formula (4).

[Chem. 16]

$$—C_nF_{2n+1} \quad (3)$$

In the formula (3), n is an integer of 1 to 6.

[Chem. 17]

$$—(CF_2—CF_2)_a(CF_2—CH_2)_b C_{n'}F_{2n'+1} \quad (4)$$

In the formula (4), a is an integer of 0 to 3, b is an integer of 1 to 2, n' is an integer of 1 to 6,
—$C_{n'}F_{2n'+1}$ group is bonded to $CH_2$ group of —$(CF_2CH_2)_b$— group, and —$(CF_2CF_2)_a$— group is bonded to $CF_2$ group of —$(CF_2CH_2)_b$— group.

When the Rf is a fluoroalkyl group represented by the formula (4), a is preferably 1 or 2.

On the other hand, when the Rf is a fluoroalkyl group represented by the formula (3), n is preferably 4 or 6.

In the present specification, the term "(meth)acrylic ester" is used to have a concept including both of acrylic ester and methacrylic ester.

In the present invention, as a RAFT agent used in the production of the fluorine-containing macroinitiator of the present invention, the trithiocarbonic ester compound (5) is used from the viewpoints of polymerization rate and degree of polymerization of the fluorine-containing (meth)acrylic ester. Specific preferred examples of the trithiocarbonic ester compounds (5) used in the present invention include 2-cyano-2-propyl dodecyl trithiocarbonate, 4-cyano-4-[(dodecylsulfanylthiocarbonyl)sulfanyl]pentanoic acid and cyanomethyl dodecyl trithiocarbonate.

The amount of the trithiocarbonic ester compound used cannot be said indiscriminately, but a standard of the amount thereof can be determined by the following formula.

$$W(RAFT)=W(FA) \times M(RAFT)/MW(FMI)$$

Here, the symbols represent the following.
W(RAFT): amount of trithiocarbonic ester used (g)
W(FA): amount of fluorine-containing (meth)acrylic ester used (g)
M(RAFT): molecular weight of trithiocarbonic ester compound (g/mol)
MW(FMI): desired molecular weight of fluorine-containing macroinitiator (g/mol)

In a preferred embodiment of the present invention, the trithiocarbonic ester compound (5) is used usually in an amount of about 0.2 to 15 wt % based on the fluorine-containing (meth)acrylic ester.

Specific preferred examples of the fluorine-containing (meth)acrylic esters represented by the formula (6) for use in the production of the fluorine-containing macroinitiator of the present invention include:
3,3,4,4,5,5,6,6,6-nonafluorohexyl acrylate, 3,3,4,4,5,5,6,6,7,7,8,8,8-tridecafluorooctyl acrylate, 3,3,5,5,6,6,7,7,8,8,8-undecafluorooctyl acrylate, 3,3,4,4,5,5,7,7,8,8,8-undecafluorooctyl acrylate, 3,3,5,5,6,6,7,7,8,8,9,9,10,10,10-pentadecafluorodecyl acrylate, 3,3,4,4,5,5,7,7,8,8,9,9,10,10,10-pentadecafluorodecyl acrylate, 3,3,4,4,5,5,6,6,7,7,9,9,10,10,10-pentadecafluorodecyl acrylate, 3,3,4,4,5,5,7,7,8,8,9,9,10,10,11,11,12,12,12-nonadecafluorododecyl acrylate, 3,3,4,4,5,5,6,6,7,7,9,9,10,10,11,11,12,12,12-nonadecafluorododecyl acrylate, 3,3,4,4,5,5,6,6,7,7,8,8,9,9,11,11,12,12,12-nonadecafluorododecyl acrylate, 3,3,4,4,5,5,6,6,7,7,9,9,10,10,11,11,12,12,13,13,14,14,14-trieicosafluorotetradecyl acrylate, 3,3,5,5,7,7,8,8,9,9,10,10,10-tridecafluorodecyl acrylate, 3,3,4,4,5,5,7,7,9,9,10,10,10-tridecafluorodecyl acrylate, 3,3,5,5,7,7,8,8,9,9,10,10,11,11,12,12,12-heptadecafluorododecyl acrylate, 3,3,4,4,5,5,7,7,9,9,10,10,11,11,12,12,12-heptadecafluorododecyl acrylate, 3,3,4,4,5,5,6,6,7,7,9,9,11,11,12,12,12-heptadecafluorododecyl acrylate, 3,3,4,4,5,5,7,7,9,9,10,10,11,11,12,12,13,13,14,14-heneicosafluorotetradecyl acrylate, 3,3,4,4,5,5,6,6,7,7,9,9,11,11,12,12,13,13,14,14-heneicosafluorotetradecyl acrylate, 3,3,4,4,5,5,6,6,7,7,9,9,11,11,12,12,13,13,14,14,15,15,16,16,16-pentaeicosafluorohexadecyl acrylate, 3,3,4,4,5,5,6,6,6-nonafluorohexyl methacrylate, 3,3,4,4,5,5,6,6,7,7,8,8,8-tridecafluorooctyl methacrylate, 3,3,5,5,6,6,7,7,8,8,8-undecafluorooctyl methacrylate, 3,3,4,4,5,5,7,7,8,8,8-undecafluorooctyl methacrylate, 3,3,5,5,6,6,7,7,8,8,9,9,10,10,10-pentadecafluorodecyl methacrylate, 3,3,4,4,5,5,7,7,8,8,9,9,10,10,10-pentadecafluorodecyl methacrylate, 3,3,4,4,5,5,6,6,7,7,9,9,10,10,10-pentadecafluorodecyl methacrylate, 3,3,4,4,5,5,7,7,8,8,9,9,10,10,11,11,12,12,12-nonadecafluorododecyl methacrylate, 3,3,4,4,5,5,6,6,7,7,9,9,10,10,11,11,12,12,12-nonadecafluorododecyl methacrylate, 3,3,4,4,5,5,6,6,7,7,8,8,9,9,11,11,12,12,12-nonadecafluorododecyl methacrylate, 3,3,4,4,5,5,6,6,7,7,9,9,10,10,11,11,12,12,13,13,14,14,14-trieicosafluorotetradecyl methacrylate, 3,3,5,5,7,7,8,8,9,9,10,10,10-tridecafluorodecyl methacrylate, 3,3,4,4,5,5,7,7,9,9,10,10,10-tridecafluorodecyl methacrylate, 3,3,5,5,7,7,8,8,9,9,10,10,11,11,12,12,12-heptadecafluorododecyl methacrylate, 3,3,4,4,5,5,7,7,9,9,10,10,11,11,12,12,12-heptadecafluorododecyl methacrylate, 3,3,4,4,5,5,6,6,7,7,9,9,11,11,12,12,12-heptadecafluorododecyl methacrylate, 3,3,4,4,5,5,7,7,9,9,10,10,11,11,12,12,13,13,14,14-heneicosafluorotetradecyl methacrylate, 3,3,4,4,5,5,6,6,7,7,9,9,11,11,12,12,13,13,14,14-heneicosafluorotetradecyl methacrylate, and 3,3,4,4,5,5,6,6,7,7,9,9,11,11,12,12,13,13,14,14,15,15,16,16,16-pentaeicosafluorohexadecyl methacrylate.

In the present invention, the fluorine-containing (meth) acrylic esters (6) may be used singly, or may be used in combination of two or more kinds.

In the present invention, as a radical polymerization initiator used in the production of the fluorine-containing macroinitiator, an azo-based radical polymerization initiator is used. The azo-based radical polymerization initiator used in the present invention is not specifically restricted, but specific preferred examples thereof include 2,2'-azobis (isobutyronitrile), 2,2'-azobis(2,4-dimethylvaleronitrile), 4,4'-azobis(4-cyanovaleric acid) and 1,1'-azobis(cyclohexane-1-carbonitrile).

In a preferred embodiment of the present invention, the azo-based radical polymerization initiator is used usually in an amount of 5 to 45 mol %, preferably 5 to 30 mol %, more preferably 10 to 20 mol %, based on the trithiocarbonic ester compound (5). If the amount thereof is less than 5 mol %, reduction in polymerization yield may be brought about. If the amount thereof is more than 30 mol %, particularly more than 45 mol %, an inert homopolymer of the fluorine-containing (meth)acrylic ester (6) (i.e., homopolymer in which no trithiocarbonic ester compound is concerned) tends to be readily produced. The amount of the azo-based radical polymerization initiator used depends also on reactivity of the fluorine-containing (meth)acrylic ester (6). Generally, in the case of a fluorine-containing (meth)acrylic ester (6) having low reactivity, the azo-based radical polymerization initiator is used in high concentration. On the other hand, when the reactivity is high, the azo-based radical polymerization initiator is used in low concentration.

Polymerization of the fluorine-containing (meth)acrylic ester (6) can be carried out without a solvent (bulk polymerization) or in an appropriate organic solvent. As the solvent used for the polymerization reaction, a fluorine-containing solvent such as 1,3-bis(trifluoromethyl)benzene is preferable. From the viewpoint of securing given polymerization rate and polymerization yield, the fluorine-containing solvent is used usually in an amount of 0 to 300 wt %, more preferably 0 to 200 wt %, based on the fluorine-containing (meth)acrylic ester (6). If the amount of the solvent is more than 300 wt %, lowering of polymerization rate and reduction in polymerization yield may be brought about.

Polymerization of the fluorine-containing (meth)acrylic ester (6) is carried out usually at 0 to 150° C., preferably 40 to 100° C. In more detail, polymerization of the fluorine-containing acrylic ester is preferably carried out at 40 to 80° C., and polymerization of the fluorine-containing methacrylic ester is preferably carried out at 60 to 100° C. If the polymerization temperature is lower than 0° C., a sufficient polymerization rate is not attained, and this sometimes leads to reduction in polymerization yield. On the other hand, if the temperature exceeds 150° C., undesired chain transfer reaction may occur.

A reaction container used when the fluorine-containing (meth)acrylic ester (6) is polymerized using the azo-based radical polymerization initiator in the presence of the trithiocarbonic ester compound (5) is not specifically restricted as long as it does not cause any trouble in carrying out the polymerization reaction, such as decomposition of the trithiocarbonic ester compound (5) or termination of the polymerization reaction. However, a borosilicate glass reaction container is preferable. As the borosilicate glass reaction container employable in the present invention, a borosilicate glass reaction container that is generally on the market may be used in some cases, but the trithiocarbonic ester compound (5) may be decomposed during the course of the polymerization reaction to thereby terminate the polymerization reaction, and hence a high polymerization yield tends to be unable to be stably attained frequently.

For the above reason, a borosilicate tempered glass reaction container is recommended as the reaction container used for carrying out the polymerization reaction in the present invention. The borosilicate tempered glass is produced by subjecting borosilicate glass to air-cooling tempering.

The reason why the fluorine-containing macroinitiator of the present invention can be readily and efficiently produced by the use of a borosilicate tempered glass reaction container is not clear, but it is presumed that the container surface probably has a structure chemically or physically inert to the trithiocarbonic ester compound (5).

Specific examples of preferred reaction containers include Hiper Glass (registered trademark) cylinders manufactured by Taiatsu Techno Corporation. For example, HPG-10, HPG-96, TEM-U1000N, TEM-V-100, TEM-V-200, TEM-V-300, TEM-V-500, TEM-4-B1-2L and TEM-4-B1-4L (all manufactured by Taiatsu Techno Corporation) can be mentioned.

It has been confirmed by the present inventors that not only the borosilicate tempered glass reaction container but also a stainless steel reaction container can be preferably used in the present invention as the reaction container employable for carrying out the polymerization reaction.

Therefore, it is preferable to carry out the polymerization reaction in a borosilicate tempered glass reaction container or a stainless steel reaction container in the production process according to the present invention.

The fluorine-containing macroinitiator of the present invention can be preferably used for producing a fluorine-containing block copolymer such as (A)n(B)m, (A)n(B)m(A)l or (A)n(B)m(C)l. In particular, the fluorine-containing macroinitiator can be preferably used for producing a fluorine-containing block copolymer containing a non-fluorine (meth)acrylic ester or styrene though block polymerization of the non-fluorine (meth)acrylic ester or the styrene has been difficult in the RAFT polymerization in the past. Moreover, the fluorine-containing macroinitiator is preferable also when a fluorine-containing block copolymer having a high degree of copolymerization of a fluorine-containing (meth)acrylic ester is produced.

The fluorine-containing block copolymer derived from the fluorine-containing macroinitiator of the present invention has good static water and oil repellency and dynamic water and oil repellency, and can be applied to a variety of surface treatment agents.

EXAMPLES

Next, the present invention is described with reference to the following examples.

[GPC Analysis]

Column: Four columns of Shodex KF-807L (available from Showa Denko K.K.) were used.

Measurement temperature: 40° C.

Sample injection quantity: 100 μl

Flow rate: 1 ml/min

Eluent: tetrahydrofuran

[Molecular Weight Measurement]

Number-average molecular weight of a fluorine-containing macroinitiator was determined by $^1$H-NMR measurement using the following formula.

$$M(MI)=M(FA) \times I(Ha)/I(Hb)$$

Here, the symbols represent the following (see the following chemical formula).

M(MI): molecular weight of fluorine-containing macroinitiator

M(FA): molecular weight of fluorine-containing (meth)acrylic ester

I(Ha): integrated value of peak Ha

I(Hb): integrated value of peak Hb

[chem. 18]

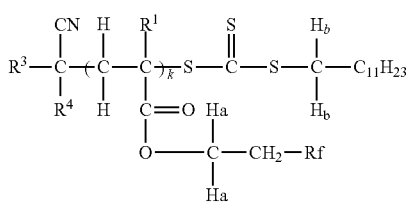

Apparatus: JEOL JNM-LA300 (JEOL Ltd.)
Solvent: hexafluorobenzene
Chemical shift: $^1$H is based on TMS. $^{19}$F is based on CFCl$_3$.

[Degree of Polymerization]

Degree of Polymerization=solids concentration of polymer solution (measured value)/solids concentration given on the assumption that the degree of polymerization is 100% (calculated value)

[Water and Oil Repellency]

A 6 wt % tetrahydrofuran solution of a block copolymer was applied to a surface of a SUS304 plate (0.8×15×50 mm) by the use of a spin coater, and after drying, dynamic contact angles were measured by the use of a Drop Master DM500 (manufactured by Kyowa Interface Science Co., Ltd.).

As the dynamic contact angles, a contact angle against water and a contact angle against n-hexadecane were measured as shown below.

[Analysis of Molecular End]

Analysis of molecular end was carried out by means of Fourier transform infrared spectroscopy (FT-IR-480Plus, manufactured by JASCO Corporation).

Abbreviations of chemical products used in the examples are shown below.

AIBN:2,2'-azobis(isobutyronitrile) [available from Wako Pure Chemical Industries, Ltd.]

V-65:2,2'-azobis(2,4-dimethylvaleronitrile) [available from Wako Pure Chemical Industries, Ltd.]

MTF: 1,3-bis(trifluoromethyl)benzene

CDSTSP: 4-cyano-4-[(dodecylsulfanylthiocarbonyl)sufanyl]pentanoic acid (available from Aldrich; the structural formula is shown below.)

[Chem. 19]

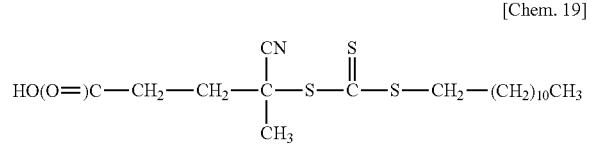

CPDTC: 2-cyano-2-propyl dodecyl trithiocarbonate (available from Aldrich; the structural formula is shown below.)

[Chem. 20]

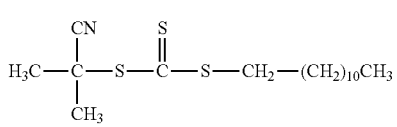

CMDTC: cyanomethyl dodecyl trithiocarbonate (available from Aldrich; the structural formula is shown below.)

[Chem. 21]

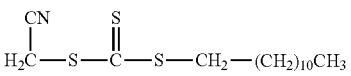

FAAC4: 3,3,4,4,5,5,6,6,6-nonafluorohexyl acrylate
FAAC6: 3,3,4,4,5,5,6,6,7,7,8,8,8-tridecafluorooctyl acrylate
FAAC10(2H): 3,3,4,4,5,5,6,6,7,7,9,9,10,10,11,11,12,12,12-nonadecafluorododec yl acrylate
FAMAC6: 3,3,4,4,5,5,6,6,7,7,8,8,8-tridecafluorooctyl methacrylate Reference Example 1-1

In a borosilicate glass Schlenk tube having an internal volume of 50 ml (manufactured by Kiriyama Glass Co.), a magnetic stirrer, 1.5 g of FAAC4, 60 mg of CDSTSP, 7.4 mg of V-65 and 1.0 g of MTF were placed. The Schlenk tube was immersed in liquid nitrogen to allow its contents to freeze, and thereafter, the Schlenk tube was degassed for 5 minutes by means of an oil-sealed rotary vacuum pump. Subsequently, the Schlenk tube was immersed in an oil bath at 60° C. When about 80 minutes passed from the initiation of polymerization, a large amount of a yellow insoluble matter was precipitated in the container. After 16 hours, the Schlenk tube was cooled down to room temperature, and the pressure in the Schlenk tube was released to atmospheric pressure. From the measurement of solids content of the polymer solution, the degree of polymerization proved to be 3%.

Reference Example 1-2

Polymerization reaction was carried out in the same manner as in Reference Example 1-1, except that 1.5 g of FAAC6 was placed instead of FAAC4. Similarly to Reference Example 1-1, a large amount of a yellow insoluble matter was precipitated in the reaction container in about 60 minutes from the initiation of polymerization. The degree of polymerization was 2%.

Reference Example 1-3

Polymerization reaction was carried out in the same manner as in Reference Example 1-1, except that 1.5 g of FAAC10 (2H) was placed instead of FAAC4. In about 100 minutes from the initiation of polymerization, a large amount of a yellow insoluble matter was precipitated in the reaction container. The degree of polymerization was 3%.

Reference Example 1-4

Polymerization reaction was carried out in the same manner as in Reference Example 1-2, except that 52 mg of CPDTC was placed instead of CDSTSP. In about 180 minutes from the initiation of polymerization, a small amount of a yellow insoluble matter was precipitated in the reaction container. The degree of polymerization was 3%.

Reference Example 1-5

Polymerization reaction was carried out in the same manner as in Reference Example 1-3, except that 52 mg of CPDTC was placed instead of CDSTSP. In about 180 minutes from the initiation of polymerization, a small amount of a yellow insoluble matter was precipitated in the reaction container. The degree of polymerization was 5%.

The results of Reference Examples 1-1 to 1-5 are summarized in Table 1.

TABLE 1

| | | Ref. Ex. 1-1 | Ref. Ex. 1-2 | Ref. Ex. 1-3 | Ref. Ex. 1-4 | Ref. Ex. 1-5 |
|---|---|---|---|---|---|---|
| Fluorine-containing (meth) acrylic ester (g) | FAAC4 | 1.5 | — | — | — | — |
| | FAAC6 | — | 1.5 | — | 1.5 | — |
| | FAAC10 (2H) | — | — | 1.5 | — | 1.5 |
| | FAMAC6 | — | — | — | — | — |
| | FAMAC10 (2H) | — | — | — | — | — |
| RAFT agent (mg) | CDSTSP | 60 | 60 | 60 | — | — |
| | CPDTC | — | — | — | 52 | 52 |
| | CMDTC | — | — | — | — | — |
| Polymerization initiator (mg) | AIBN | — | — | — | — | — |
| | V-65 | 7.4 | 7.4 | 7.4 | 7.4 | 7.4 |
| Polymerization solvent (g) | MTF | 1.0 | 1.0 | 1.0 | 1.0 | 1.0 |
| Reaction container | | 50 ml Schlenk tube (manufactured by Kiriyama Glass Co.) | | | | |
| Polymerization temperature/time | | 60° C./16 hours | | | | |
| Degree of Polymerization (%) | | 3 | 2 | 3 | 3 | 5 |
| Number-average molecular weight of fluorine-containing macroinitiator | | — | — | — | — | — |

Examples 1-1 to 1-14

In a Hiper Glass (registered trademark) cylinder having an internal volume of 96 ml (HPG-96, manufactured by Taiatsu Techno Corporation), a magnetic stirrer, 1.5 g of a fluorine-containing (meth)acrylic ester, a given amount of a RAFT agent, a given amount of a polymerization initiator and 1.0 g of MTF were placed. The cylinder was immersed in liquid nitrogen to allow its contents to freeze, and thereafter, the cylinder was degassed for 5 minutes by means of an oil-sealed rotary vacuum pump. After the needle valve was closed, the cylinder was immersed in an oil bath at 60° C. or 80° C. After 16 hours, the cylinder was cooled down to room temperature, and the pressure in the cylinder was released to atmospheric pressure to give a polymer solution of a fluorine-containing macroinitiator. From the solids concentration of the contents, a degree of polymerization was determined. Further, the polymer solution was added to methanol to perform reprecipitation, and then the precipitate was dried in a vacuum dryer to isolate the fluorine-containing macroinitiator. The resulting fluorine-containing macroinitiator was analyzed by $^1$H-NMR to determine a number-average molecular weight. The presence of a nitrile group-containing molecular end of the fluorine-containing initiator was confirmed by absorption of a nitrile group at 2234 to 2236 cm$^{-1}$ in infrared spectroscopy. On the other hand, the presence of a trithiocarbonic ester molecular end was confirmed by a peak at 3.0 to 3.3 ppm assigned to —S—C(=S)—S—C$\underline{H_2}$—C$_{11}$H$_{23}$ in $^1$H-NMR.

TABLE 2

| | | Ex. 1-1 | Ex. 1-2 | Ex. 1-3 | Ex. 1-4 | Ex. 1-5 |
|---|---|---|---|---|---|---|
| Fluorine-containing (meth) acrylic ester (g) | FAAC4 | 1.5 | — | — | — | — |
| | FAAC6 | — | 1.5 | 1.5 | 1.5 | 1.5 |
| | FAAC10 (2H) | — | — | — | — | — |
| | FAMAC6 | — | — | — | — | — |
| | FAMAC10 (2H) | — | — | — | — | — |
| RAFT agent (mg) | CDSTSP | — | 30 | 120 | — | — |
| | CPDTC | 52 | — | — | 26 | 52 |
| | CMDTC | — | — | — | — | — |
| Polymerization initiator (mg) | AIBN | — | — | — | — | — |
| | V-65 | 7.4 | 7.4 | 7.4 | 7.4 | 7.4 |
| Polymerization solvent (g) | MTF | 1.0 | 1.0 | 1.0 | 1.0 | 1.0 |
| Reaction container | | 96 ml Hiper Glass (R) cylinder HPG-96 (manufactured by Taiatsu Techno Corporation) | | | | |
| Polymerization temperature/time | | 60° C./16 hours | | | | |
| Degree of Polymerization (%) | | 100 | 98 | 96 | 96 | 96 |
| Number-average molecular weight of fluorine-containing macroinitiator | | 10,000 | 23,000 | 5,500 | 23,000 | 10,000 |

TABLE 3

| | | Ex. 1-6 | Ex. 1-7 | Ex. 1-8 | Ex. 1-9 | Ex. 1-10 |
|---|---|---|---|---|---|---|
| Fluorine-containing (meth) acrylic ester (g) | FAAC4 | — | — | — | — | — |
| | FAAC6 | 1.5 | 1.5 | — | — | — |
| | FAAC10 (2H) | — | — | 1.5 | 1.5 | 1.5 |

TABLE 3-continued

| | | Ex. 1-6 | Ex. 1-7 | Ex. 1-8 | Ex. 1-9 | Ex. 1-10 |
|---|---|---|---|---|---|---|
| | FAMAC6 | — | — | — | — | — |
| | FAMAC10 (2H) | — | — | — | — | — |
| RAFT agent (mg) | CDSTSP | — | — | 30 | 60 | — |
| | CPDTC | 104 | — | — | — | 26 |
| | CMDTC | — | 48 | — | — | — |
| Polymerization initiator (mg) | AIBN | — | — | — | — | — |
| | V-65 | 14.8 | 7.4 | 3.7 | 7.4 | 3.7 |
| Polymerization solvent (g) | MTF | 1.0 | 1.0 | 1.0 | 1.0 | 1.0 |
| Reaction container | | 96 ml Hiper Glass (R) cylinder HPG-96 (manufactured by Taiatsu Techno Corporation) | | | | |
| Polymerization temperature/time | | 60° C./16 hours | | | | |
| Degree of Polymerization (%) | | 97 | 100 | 97 | 95 | 95 |
| Number-average molecular weight of fluorine-containing macroinitiator | | 5,600 | 11,000 | 21,000 | 10,000 | 20,000 |

TABLE 4

| | | Ex. 1-11 | Ex. 1-12 | Ex. 1-13 | Ex. 1-14 |
|---|---|---|---|---|---|
| Fluorine-containing (meth) acrylic ester (g) | FAAC4 | — | — | — | — |
| | FAAC6 | — | — | — | — |
| | FAAC10 (2H) | 1.5 | 1.5 | 1.5 | — |
| | FAMAC6 | — | — | — | 1.5 |
| | FAMAC10 (2H) | — | — | — | — |
| RAFT agent (mg) | CDSTSP | — | — | — | 60 |
| | CPDTC | 52 | 104 | — | — |
| | CMDTC | — | — | 48 | — |
| Polymerization initiator (mg) | AIBN | — | — | — | 4.9 |
| | V-65 | 7.4 | 14.8 | 7.4 | — |
| Polymerization solvent (g) | MTF | 1.0 | 1.0 | 1.0 | 1.0 |
| Reaction container | | 96 ml Hiper Glass (R) cylinder HPG-96 (manufactured by Taiatsu Techno Corporation) | | | |
| Polymerization temperature/time | | 60° C./16 hours | | | 80° C./16 hours |
| Degree of Polymerization (%) | | 96 | 96 | 100 | 100 |
| Number-average molecular weight of fluorine-containing macroinitiator | | 10,000 | 4,800 | 11,000 | 12,000 |

Example 2-1

Preparation of Fluorine-Containing Macroinitiator

In a Hiper Glass (registered trademark) cylinder having an internal volume of 96 ml (HPG-96, manufactured by Taiatsu Techno Corporation), a magnetic stirrer, 4.0 g of FAAC6, 0.10 g of CDSTSP, 12.3 mg of V-65 and 2.6 g of MTF were placed. The cylinder was immersed in liquid nitrogen allow its contents to freeze, and thereafter, the cylinder was degassed for 5 minutes by means of an oil-sealed rotary vacuum pump. After the needle valve was closed, the cylinder was immersed in an oil bath at 60° C. After 16 hours, the cylinder was cooled down to room temperature, and the pressure in the cylinder was released to atmospheric pressure to give a solution of a fluorine-containing macroinitiator (referred to as a "polymer solution A1" hereinafter). From the solids concentration of the contents, the degree of polymerization proved to be 99%.

Preparation of (Homopolymer of FAAC6)-b(Block)-(Poly(Stearyl Acrylate))

To the polymer solution A1 in the cylinder, 1.0 g of stearyl acrylate, 6.2 mg of V-65, 2.0 g of MTF and 1.0 g of toluene were added. The cylinder was immersed in liquid nitrogen to allow its contents to freeze, and thereafter, the cylinder was degassed for 5 minutes by means of an oil-sealed rotary vacuum pump. After the needle valve was closed, the cylinder was immersed in an oil bath at 60° C. for 16 hours. The cylinder was cooled down to room temperature, and the pressure in the cylinder was released to atmospheric pressure to give a polymer solution (referred to as a "polymer solution A2" hereinafter). From the solids concentration of the contents, the degree of polymerization proved to be 98%.

The resulting polymer solution A2 was added dropwise to methanol to reprecipitate a copolymer. Subsequently, the solid matter was vacuum dried at 80° C. for 5 hours to remove a volatile component. The resulting copolymer was analyzed by GPC, and as a result, a unimodal peak was observed. From this result, the copolymer was confirmed to be (homopolymer of FAAC6)-b(block)-(poly(stearyl acrylate)) (see FIG. 1). Further, by means of $^1$H-NMR analysis, a number-average molecular weight and composition of the fluorine-containing block copolymer were determined (calculation was carried out using a ratio between a 4.3 ppm peak (polyFAAC6) integrated value and a 4.0 ppm peak (poly(stearyl acrylate)) integrated value).

Reference Example 2-1

Preparation of Non-Fluorine Macroinitiator

In a Hiper Glass (registered trademark) cylinder having an internal volume of 96 ml (HPG-96, manufactured by Taiatsu Techno Corporation), a magnetic stirrer, 1.0 g of stearyl acrylate, 0.10 g of CDSTSP, 6.2 mg of V-65 and 1.0 g of toluene were placed. The cylinder was immersed in liquid nitrogen to allow its contents to freeze, and thereafter, the cylinder was degassed for 5 minutes by means of an oil-sealed rotary vacuum pump. After the needle valve was closed, the cylinder was immersed in an oil bath at 60° C. for 16 hours. The cylinder was cooled down to room temperature, and the pressure in the cylinder was released to atmospheric pressure to give a solution of a fluorine-containing macroinitiator (referred to as a "polymer solution Z1" hereinafter). From the solids concentration of the contents, the degree of polymerization proved to be 96%.

Preparation of (Poly(Stearyl Acrylate))-b(Block)-(Homopolymer of FAAC6)

To the polymer solution Z1 in the cylinder, 4.0 g of FAAC6, 12.3 mg of V-65 and 4.6 g of MTF were added. The cylinder was immersed in liquid nitrogen to allow its contents to freeze, and thereafter, the cylinder was degassed for 5 minutes by means of an oil-sealed rotary vacuum pump. After the needle valve was closed, the cylinder was immersed in an oil bath at 60° C. for 16 hours. The cylinder was cooled down to room temperature, and the pressure in the cylinder was released to atmospheric pressure to give a polymer solution (referred to as a "polymer solution Z2" hereinafter). From the solids concentration of the contents, the degree of polymerization proved to be 97%.

The resulting polymer solution Z2 was added dropwise to methanol to reprecipitate a copolymer. Subsequently, the solid matter was vacuum dried at 80° C. for 5 hours to remove a volatile component. The resulting copolymer was analyzed by GPC, and as a result, plural peaks were observed. From this result, the copolymer was confirmed to be a mixture of (homopolymer of FAAC6)-b(block)-(poly (stearyl acrylate)), poly(stearyl acrylate) and a homopolymer of FAAC6 (see FIG. 1).

Example 2-2

Preparation of Fluorine-Containing Macroinitiator

A fluorine-containing macroinitiator was prepared in the same manner as in Example 2-1, except that FAAC10(2H) was used instead of FAAC6.

The degree of polymerization was 96%.

The resulting solution of the fluorine-containing macroinitiator is referred to as a "polymer solution B1" hereinafter.

Preparation of (Homopolymer of FAAC10(2H))-b (Block)-(Poly(Stearyl Acrylate))

Polymerization was carried out in the same manner as in preparation of (homopolymer of FAAC6)-b(block)-(poly (stearyl acrylate)) in Example 2-1, except that the polymer solution B1 was used as the solution of the fluorine-containing macroinitiator instead of the polymer solution A1. From the solids concentration of the contents, the degree of polymerization proved to be 96%.

Figure 2:
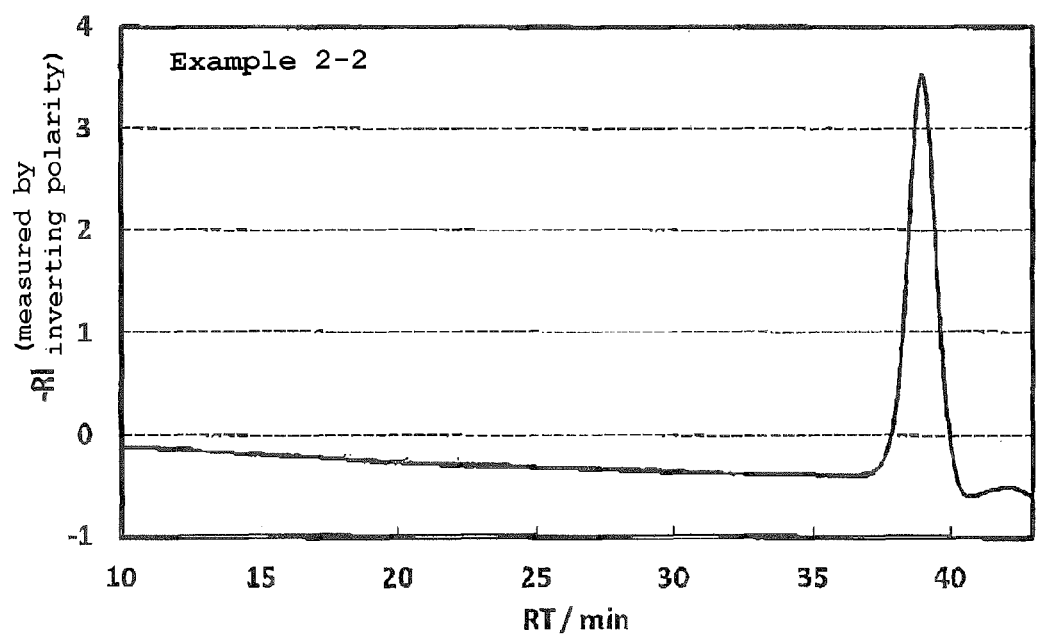
FIG. 2 shows a GPC chart of a polymer obtained in Example 2-2. Here, the polymer of Example 2-2 is a polymer obtained by polymerizing a fluorine-containing vinyl-based monomer in a first stage polymerization step to produce a fluorine-containing macroinitiator and then polymerizing stearyl acrylate in a second stage polymerization step.

The resulting copolymer was analyzed by GPC, and as a result, a unimodal peak was observed. From this result, the copolymer was confirmed to be (homopolymer of FAAC10 (2H))-b(block)-(poly(octadecyl acrylate)) (see FIG. 2).

The results of Examples 2-1 and 2-2 and Reference example 2-1 are summarized in Table 5.

TABLE 5

| | | | Ex. 2-1 | Ex. 2-2 | Ref. Ex. 2-1 |
|---|---|---|---|---|---|
| Composition of copolymer mol % (wt %) | | FAAC6 | 74 (79) | — | 76 (80) |
| | | FAAC10 (2H) | — | 68 (79) | — |
| | | Stearyl acrylate | 26 (21) | 32 (21) | 24 (20) |
| | Number-average molecular weight | | 23,000 | 20,000 | 24,000 |
| GPC analysis | | Shape of peak | unimodal | unimodal | multimodal |
| Dynamic contact angle (°) | Water | Advancing angle | 125 | 124 | — |
| | | Receding angle | 83 | 97 | — |
| | | Sliding angle | 50 | 23 | — |
| | n-Hexadecane | Advancing angle | 87 | 81 | — |
| | | Receding angle | 19 | 71 | — |
| | | Sliding angle | 62 | 11 | — |

The invention claimed is:

1. A fluorine-containing macroinitiator comprising:
a polymer represented by the following formula (1) and having a number-average molecular weight of 3,000 to 100,000,

[Chem. 1]

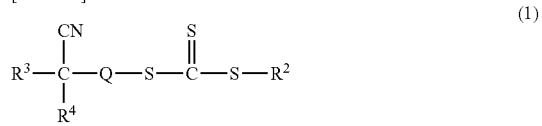

(1)

wherein $R^2$ is a straight-chain alkyl group of 1 to 18 carbon atoms,
$R^3$ and $R^4$ are each independently a hydrogen atom or an alkyl group of 1 to 3 carbon atoms, and any one of $R^3$ and $R^4$ may contain one carboxyl group, and
Q is a polymer segment composed of a structural unit represented by the following formula (2):

[Chem. 2]

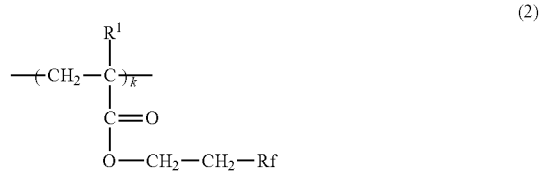

(2)

wherein $R^1$ is a hydrogen atom or a methyl group,
Rf is a fluoroalkyl group represented by the following formula (3) or a fluoroalkyl group represented by the following formula (4), and
k is an appropriate integer that is not 0,

[Chem. 3]

$$—C_nF_{2n+1} \tag{3}$$

wherein n is an integer of 1 to 6,

[Chem. 4]

$$—(CF_2—CF_2)_a(CF_2—CH_2)_b C_{n'}F_{2n'+1} \tag{4}$$

wherein a is an integer of 0 to 3, b is an integer of 1 to 2, n' is an integer of 1 to 6,
—$C_nF_{2n'+1}$ group is bonded to $CH_2$ group of —$(CF_2CH_2)_b$— group, and
—$(CF_2CF_2)_a$— group is bonded to $CF_2$ group of —$(CF_2CH_2)_b$— group.

2. The fluorine-containing macroinitiator as defined in claim 1, wherein in the formula (2), the Rf is a fluoroalkyl group represented by the formula (4), and a is 1 or 2.

3. The fluorine-containing macroinitiator as defined in claim 1, wherein in the formula (2), the Rf is a fluoroalkyl group represented by the formula (3), and n is 4 or 6.

4. A production process for the fluorine-containing macroinitiator as defined in claim 1, comprising:
a step of polymerizing a fluorine-containing (meth)acrylic ester represented by the following formula (6) by the use of an azo-based radical polymerization initiator in the presence of a trithiocarbonic ester compound represented by the following formula (5):

[Chem. 5]

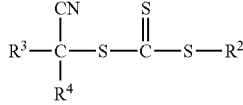

(5)

wherein $R^2$ is a straight-chain alkyl group of 1 to 18 carbon atoms, and
$R^3$ and $R^4$ are each independently a hydrogen atom or an alkyl group of 1 to 3 carbon atoms, and any one of $R^3$ and $R^4$ may contain one carboxyl group,

[Chem. 6]

$$\begin{array}{c} R^1 \\ | \\ CH_2={C} \\ | \\ C=O \\ | \\ O—CH_2—CH_2—Rf \end{array} \tag{6}$$

wherein $R^1$ is a hydrogen atom or a methyl group, and
Rf is a fluoroalkyl group represented by the following formula (3) or a fluoroalkyl group represented by the following formula (4),

[Chem. 7]

$$—C_nF_{2n+1} \tag{3}$$

wherein n is an integer of 1 to 6,

[Chem. 8]

$$—(CF_2—CF_2)_a(CF_2—CH_2)_b C_{n'}F_{2n'+1} \tag{4}$$

wherein a is an integer of 0 to 3, b is an integer of 1 to 2, n' is an integer of 1 to 6,
—$C_nF_{2n'+1}$ group is bonded to $CH_2$ group of —$(CF_2CH_2)_b$— group, and
—$(CF_2CF_2)_a$— group is bonded to $CF_2$ group of —$(CF_2CH_2)_b$— group.

5. The production process as defined in claim 4, wherein the polymerization is carried out in one of a borosilicate tempered glass reaction container or a stainless steel reaction container.

6. The production process as defined in claim 4, wherein in the formula (2), the Rf is a fluoroalkyl group represented by the formula (4), and a is 1 or 2.

7. The production process as defined in claim 4, wherein in the formula (2), the Rf is a fluoroalkyl group represented by the formula (3), and n is 4 or 6.

* * * * *

UNITED STATES PATENT AND TRADEMARK OFFICE
CERTIFICATE OF CORRECTION

PATENT NO. : 9,587,039 B2  
APPLICATION NO. : 15/107644  
DATED : March 7, 2017  
INVENTOR(S) : Satoru Saito et al.

Page 1 of 1

It is certified that error appears in the above-identified patent and that said Letters Patent is hereby corrected as shown below:

On the Title Page

Column 1, Title, Delete "FLUORINATED-CONTAINING" and
insert -- FLUORINE-CONTAINING --

In the Specification

Column 1, Line 1, delete "FLUORINATED-CONTAINING" and insert -- FLUORINE CONTAINING --

In the Claims

Column 25, Line 23, Claim 1, delete "$(CF_2CH_2)_b-$" and insert -- $-(CF_2CH_2)_b-$ --

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*